(12) United States Patent
Ali et al.

(10) Patent No.: US 11,632,400 B2
(45) Date of Patent: Apr. 18, 2023

(54) NETWORK DEVICE COMPLIANCE

(71) Applicant: Hewlett-Packard Development Company, L.P., Spring, TX (US)

(72) Inventors: Valiuddin Ali, Spring, TX (US); Endrigo N. Pinheiro, Spring, TX (US); Edson S. Behnck, Porto Alegre (BR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/054,184

(22) PCT Filed: Mar. 11, 2019

(86) PCT No.: PCT/US2019/021600
§ 371 (c)(1),
(2) Date: Nov. 10, 2020

(87) PCT Pub. No.: WO2020/185204
PCT Pub. Date: Sep. 17, 2020

(65) Prior Publication Data
US 2021/0400084 A1 Dec. 23, 2021

(51) Int. Cl.
*H04L 29/06* (2006.01)
*H04L 9/40* (2022.01)
(52) U.S. Cl.
CPC .............. *H04L 63/20* (2013.01); *H04L 63/10* (2013.01)

(58) Field of Classification Search
CPC ......... H04L 63/20; H04L 63/10; H04L 63/14; H04L 63/1433; H04W 12/08
USPC ............................................................ 726/1
See application file for complete search history.

(56) References Cited

U.S. PATENT DOCUMENTS

| | | | |
|---|---|---|---|
| 7,533,407 B2 | 5/2009 | Lewis et al. | |
| 7,617,533 B1 | 11/2009 | Hernacki | |
| 8,838,812 B2 | 9/2014 | Miller et al. | |
| 9,092,616 B2 | 7/2015 | Kimar et al. | |
| 10,043,007 B2 | 8/2018 | Brech et al. | |
| 10,278,073 B2* | 4/2019 | Li | H04W 48/08 |
| 2003/0055994 A1 | 3/2003 | Herrmann et al. | |
| 2005/0213768 A1* | 9/2005 | Durham | H04L 9/083 380/278 |
| 2006/0164199 A1 | 7/2006 | Gilde et al. | |
| 2010/0082803 A1 | 4/2010 | Nguyen | |
| 2010/0223669 A1 | 9/2010 | Vermeulen et al. | |
| 2016/0366184 A1 | 12/2016 | Luo et al. | |
| 2018/0176258 A1 | 6/2018 | Tea | |

* cited by examiner

*Primary Examiner* — Longbit Chai
(74) *Attorney, Agent, or Firm* — Knobbe, Martens, Olson & Bear, LLP

(57) ABSTRACT

Examples associated with network compliance detection are described. One example includes storing a set of security rules for a device. The device monitors the device for compliance with the security rules. Upon detecting noncompliance with an identified security rule, the device may disable network access for the device, and establish a trigger. The trigger may disable network access for the device when network access for the device is restored prior to returning the device to compliance with the identified security rule.

15 Claims, 5 Drawing Sheets

NETWORK DEVICE COMPLIANCE

BACKGROUND

Computers today are used in many aspects of society. From personal use, to work, to business, and so on, computers have become a fundamental part of our lives. Further, while some tasks can be performed on a single, disconnected device, connectivity of devices has become increasingly relevant to facilitate communication between devices to allow collaboration, exchange of information, person-to-person interaction, and so forth. This has led to the use of networks, large and small, public and private.

BRIEF DESCRIPTION OF THE DRAWINGS

The present application may be more fully appreciated in connection with the following detailed description taken in conjunction with the accompanying drawings.

DETAILED DESCRIPTION

Examples associated with network device compliance are described. As discussed above, a significant amount of society today operates based on devices attached to networks. While this functionality is valuable and useful, malicious entities also take advantage of these technologies to attempt to prey on vulnerable devices and networks to steal data, money, information, and so forth. Consequently, device and network security are paramount concerns to both users of devices, and operators of networks both to protect their own data, and to prevent the spread of, for example, malicious code in the form of viruses, worms, and other malware.

While some networks may be configured to block access to devices that are identified as not conforming with various network policies, this may not efficiently detect certain types of device compromises. Consequently, it may be desirable for devices to self-enforce certain policies stored on the device by, for example, a network device, an administrator of the device, and so forth. If the device detects that it is non-compliant with one of these policies, the device may disable its network adaptors and/or other communication components until the device has returned to compliance. Further, to prevent communication components from being, for example, installed or re-enabled, the device may establish a trigger that automatically disables new or reactivated components when they are detected.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, instructions stored on a computer-readable medium or in execution on a machine, and/or combinations of each to perform a function(s) or an action(s), and/or to cause a function or action from another module, method, and/or system. A module may include a microprocessor controlled via instructions executable by the microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 1:
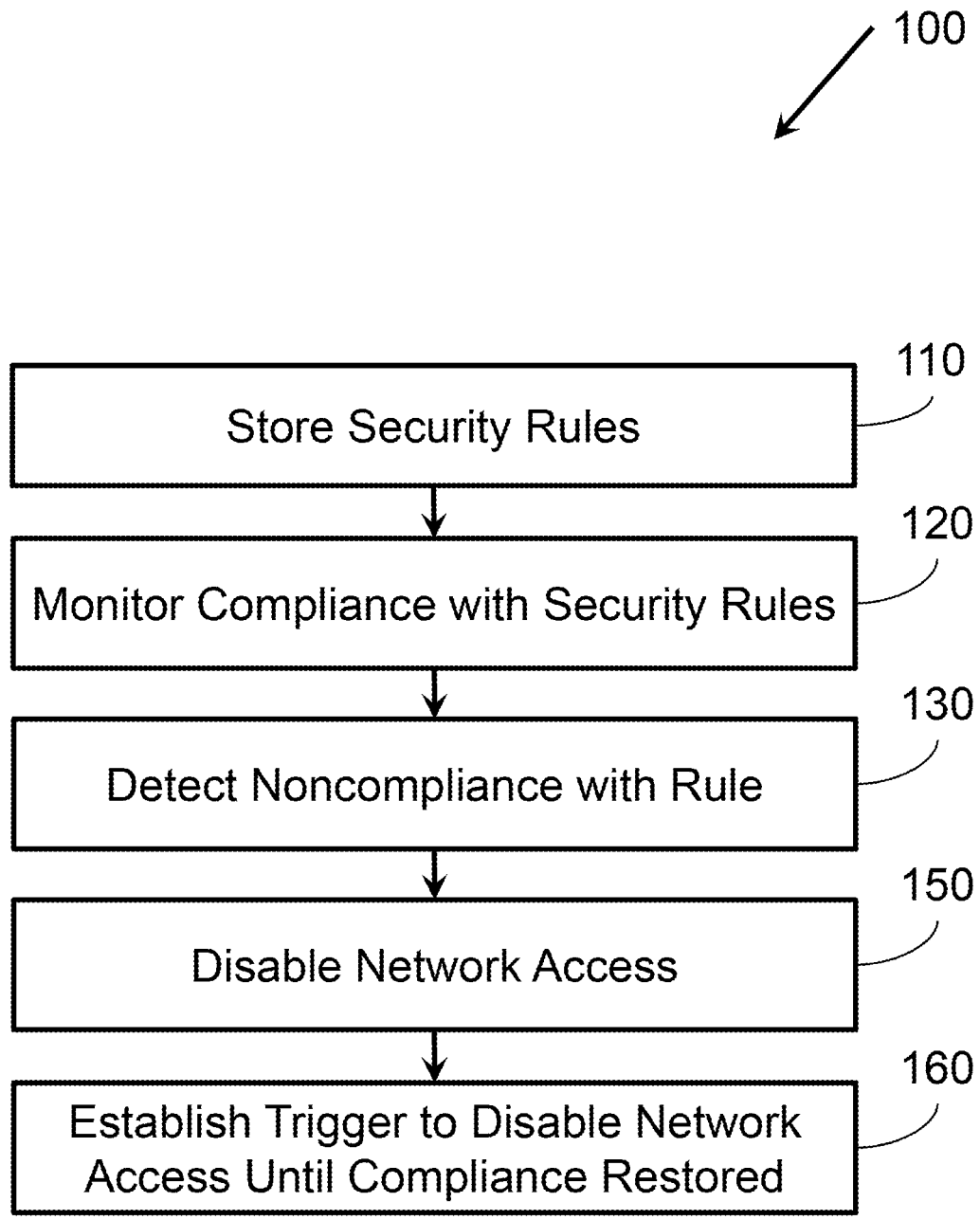
FIG. 1 illustrates a flowchart of example operations associated with network device compliance.

FIG. 1 illustrates an example method 100. Method 100 may be embodied on a non-transitory processor-readable medium storing processor-executable instructions. The instructions, when executed by a processor, may cause the processor to perform method 100. In other examples, method 100 may exist within logic gates and/or RAM of an application specific integrated circuit (ASIC).

Method 100 includes many actions associated with network device compliance. Method 100 includes storing a set of security rules at 110. The security rules may be stored by a device. The security rules may be stored on that device. The security rules may be received from, for example, a user of the device, a remote information technology resource, and so forth. Such a remote information technology resource may be responsible for maintaining security of the device, a network the device connects to, and so forth.

Many different types of security rules may be used. For example, the security rules may specify applications that should be running on the device, applications that should not be running on the device, applications that should be running when certain conditions are met, applications that should be executed based on a schedule and so forth. The security rules may also specify hardware that should be installed in the device, hardware that should not be installed in the device, and so forth. The security rules may relate to data security settings, device security settings (e.g., firewall settings, web browser settings, email settings), user privileges, geographic location of the device, network location of the device, and so forth. The security rules may also be conditional on events occurring or not occurring. By way of illustration, security rules may specify that an application does not need to be running on the device until after the application has been installed on the device, at which point the security rules may specify that the application should always be running and should not be removed without administrator authorization for the removal.

Method 100 also includes monitoring compliance with the security rules at 120. The security rules may be monitored by the device. Monitoring the security rules may include monitoring software and hardware on the device. This may include monitoring what software is and is not running, settings of various software applications, settings of an operating system of the device, and so forth. The monitoring may include periodic checks at fixed or random intervals, checks that occur when certain conditions occur, and so forth that verify whether conditions specified by the rules remain true. Different rules may be checked at differing frequencies depending on the importance of the rules. For example, a rule that verifies hardware states of the device may be checked on device startup and when new devices are detected, whereas a rule that ensures operation of an antivirus application may check that the application is active every few seconds or minutes (e.g., depending on available resources of the device).

Method 100 also includes detecting noncompliance with an identified rule at 130. In response to detecting noncompliance, method 100 includes disabling network access for the device at 150. Disabling network access for the device may include disabling a hardware component associated with network access. The hardware component may be, for example, a network card, a communications port, a wireless network adaptor, and so forth. Disabling the hardware component may include, for example, uninstalling drivers for the hardware component, preventing other applications or components from detecting the hardware component, preventing other applications or components from communicating with the hardware component, and so forth.

Additionally, in response to detecting noncompliance with the identified rule, a trigger may be established to disable network access to the device at 160. The trigger may disable network access for the device if network access to the device is restored prior to returning the device to compliance with the identified security rule. In some examples, the trigger may be based on a Windows management instrumentation (WMI) event, a platform invocation call (e.g., using P/Invoke to call an API to register for device notifications), and so forth. The trigger may be designed to activate whether network access is restored by reactivating a disabled hardware component, by installing a new component that facilitates network access, or by other techniques.

Figure 2:
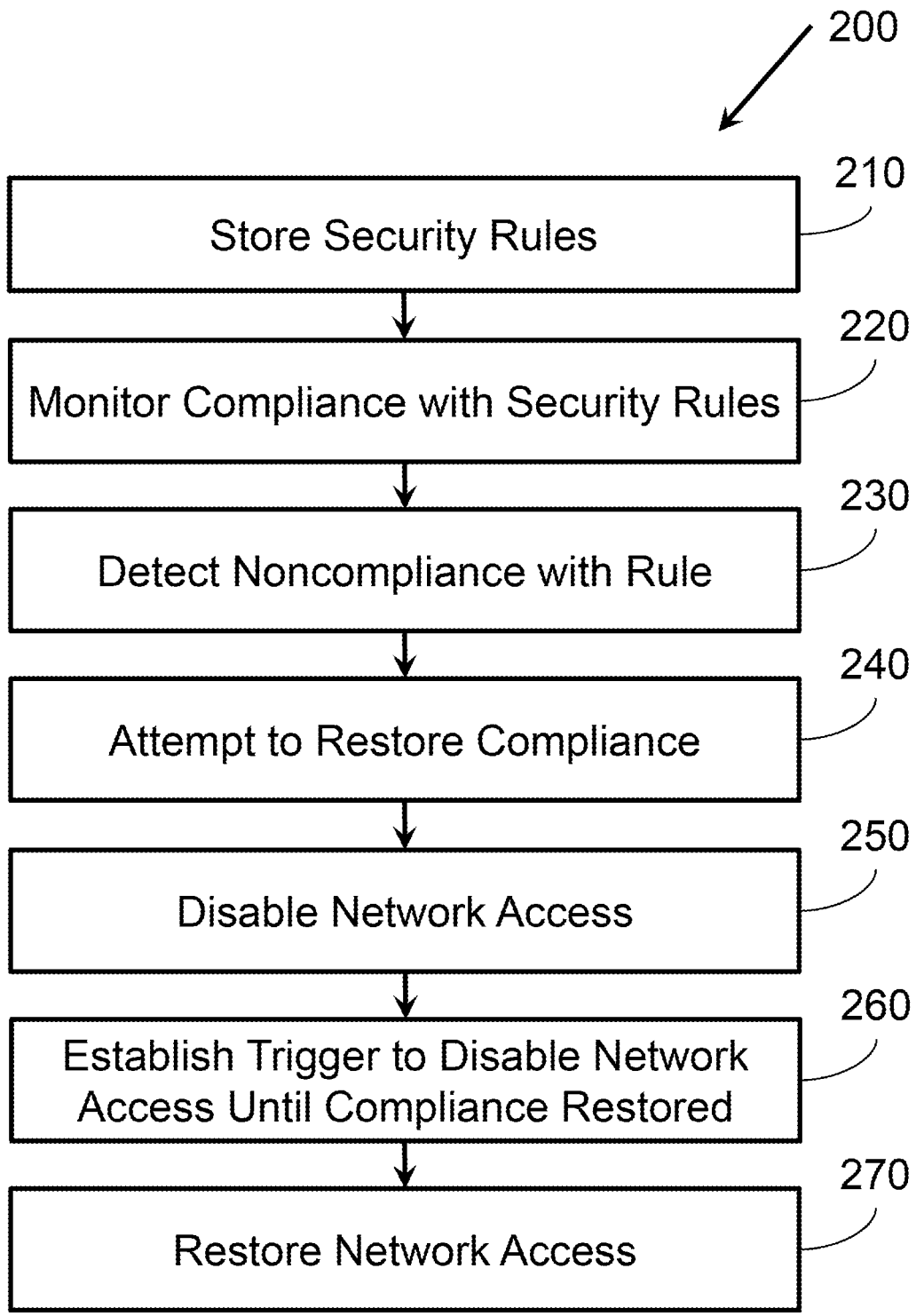
FIG. 2 illustrates another flowchart of example operations associated with network device compliance.

FIG. 2 illustrates a method 200 associated with network device compliance. Method 200 includes several actions similar to those described above with reference to method 100 (FIG. 1). For example, method 200 includes storing security rules at 210, monitoring compliance with the security rules at 220, detecting noncompliance with a rule at 230, disabling network access at 250, and establishing a trigger at 260.

Method 200 also includes restoring network access to the device at 270. Network access to the device may be restored in response to detecting the device has been returned to compliance with the identified security rule. For example, if the rule relates to a hardware component attached to the device, network access may be restored once the hardware component is removed, assuming there aren't other rule violations lingering due to the attachment of the unapproved component. In another example, successful reinstall of a removed application may, or removal of an unapproved application may allow network access to be restored. In other examples, network access to the device may be restored based on an administrator override. This may be desirable to allow an administrator to use network access to restore the device to a compliant state, to allow the device to be used despite being noncompliant under certain circumstances, and so forth.

Method 200 also includes attempting to restore the device to compliance with the identified security rule at 240. This may be performed prior to disabling network access to the device. Depending on the rule being broken, action 240 may be performed a fixed number of times using a variety of techniques. These techniques may also increase in severity. By way of illustration, the device may attempt to remove a detected malware by first attempting to quarantine the malware with an antivirus several times, by restoring the device to a recent saved checkpoint, and then by factory resetting the device. In other examples, the device may attempt to restore the device to compliance by attempting a single technique multiple times (e.g., restarting the device) to see if this resolves the non-compliance before disabling network access.

As discussed above, by storing network compliance rules on a device and having the device itself enforce compliance with the rules may protect a network in ways that monitoring network traffic of the device to detect compliance does not. Self-monitoring may also be faster at quarantining the device over monitoring network traffic of the device. Additionally, the device disabling its own network traffic may prevent malicious actions from being taking by the device on other networked devices. Further, by merely disabling network access for the device, the user may still be able to use the device, albeit without network access.

Figure 3:
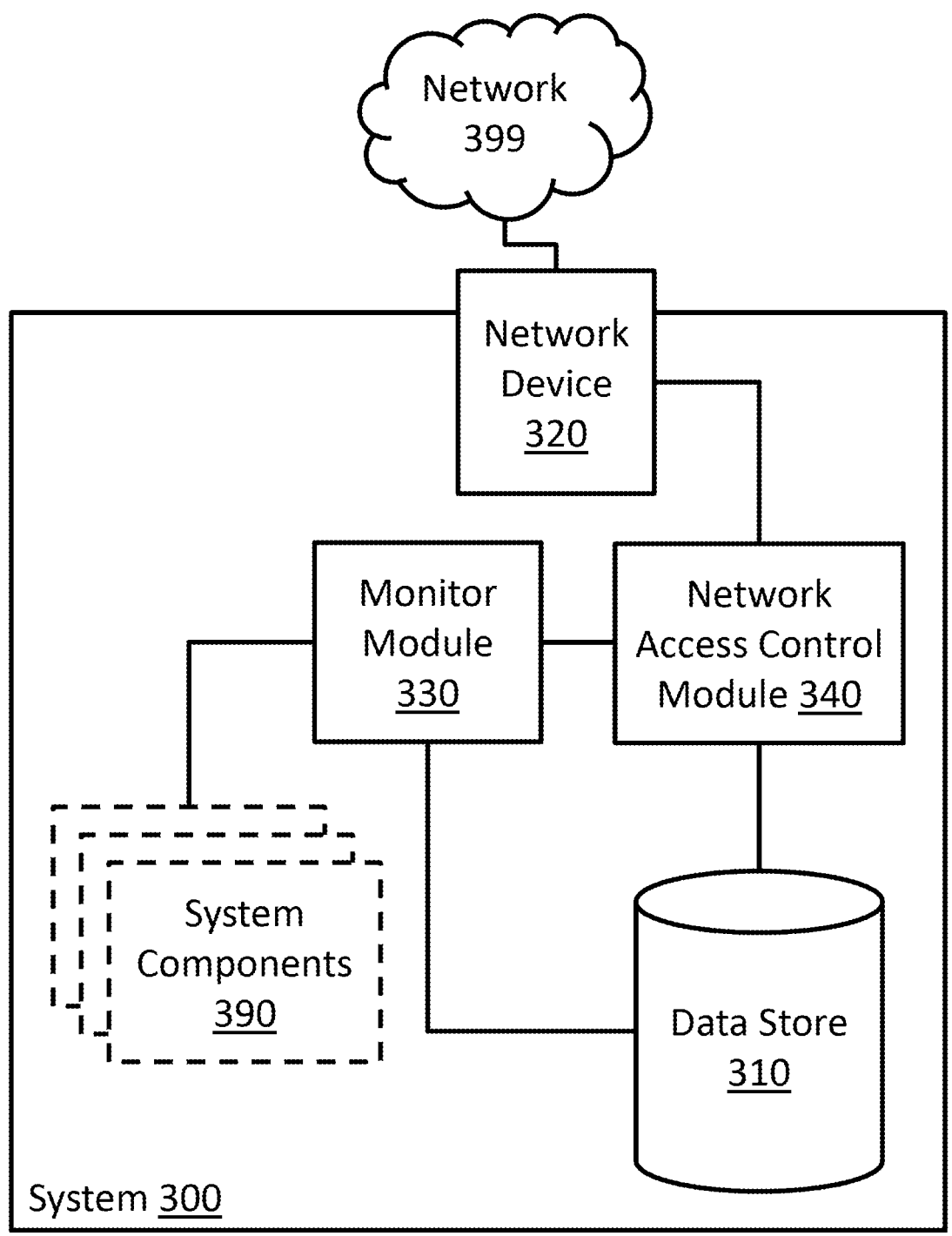
FIG. 3 illustrates another example system associated with network device compliance.

FIG. 3 illustrates a system 300 associated with network device compliance. System 300 includes a data store 310. Data store 310 may store a set of security rules for system 300. As discussed above, many rules may be implemented. The rules may be stored by a user of the device, by a remote device, and so forth.

System 300 also includes a network device 320. Network device 320 may connect system 300 to a network 399. Network device 320 may be, for example, a wired port (e.g., Universal Serial Bus, ethernet), a wireless adaptor (e.g., Bluetooth, WIFI, Near Field Communication), and so forth.

System 300 also includes a monitor module 330. Monitor module 330 may control system 300 to enter a noncompliant state upon detecting that system 300 is in noncompliance with an identified security rule. For example, depending on the contents of security rules stored in data store 310, monitor module 330 may monitor components of system 300 such as system components 390, or other components illustrated in system 300 (e.g., data store 310, network device 320, network access control module 340). The system components may include other hardware and/or software components of system 300 including physical components, peripherals, expansion cards, hard discs, random access memory chips, firmware, operating systems, software applications, settings, and so forth.

System 300 also includes a network access control module 340. Network access control module 340. Network access control module 340 may attempt to return system 300 to a compliant state by returning the system to compliance with the identified security rule. If network access control module 340 is unable to return system 300 to the compliant state, network access control module may disable network device 320. Network access control module 340 may also establish a trigger to disable network device 320 if network device 320 becomes reenabled prior to system 300 returning to a compliant state. For example, the trigger may activate when network device 320 is reenabled and notifies network access control module 340. This may allow network access control module 340 to re-disable network device 320. In another example, the trigger may activate when an installed network device is installed in system 300. The trigger may control network access control module 340 to disable the installed network device. As discussed above, the trigger may be based on a Windows WMI event, a platform invocation call, or another technique.

Figure 4:
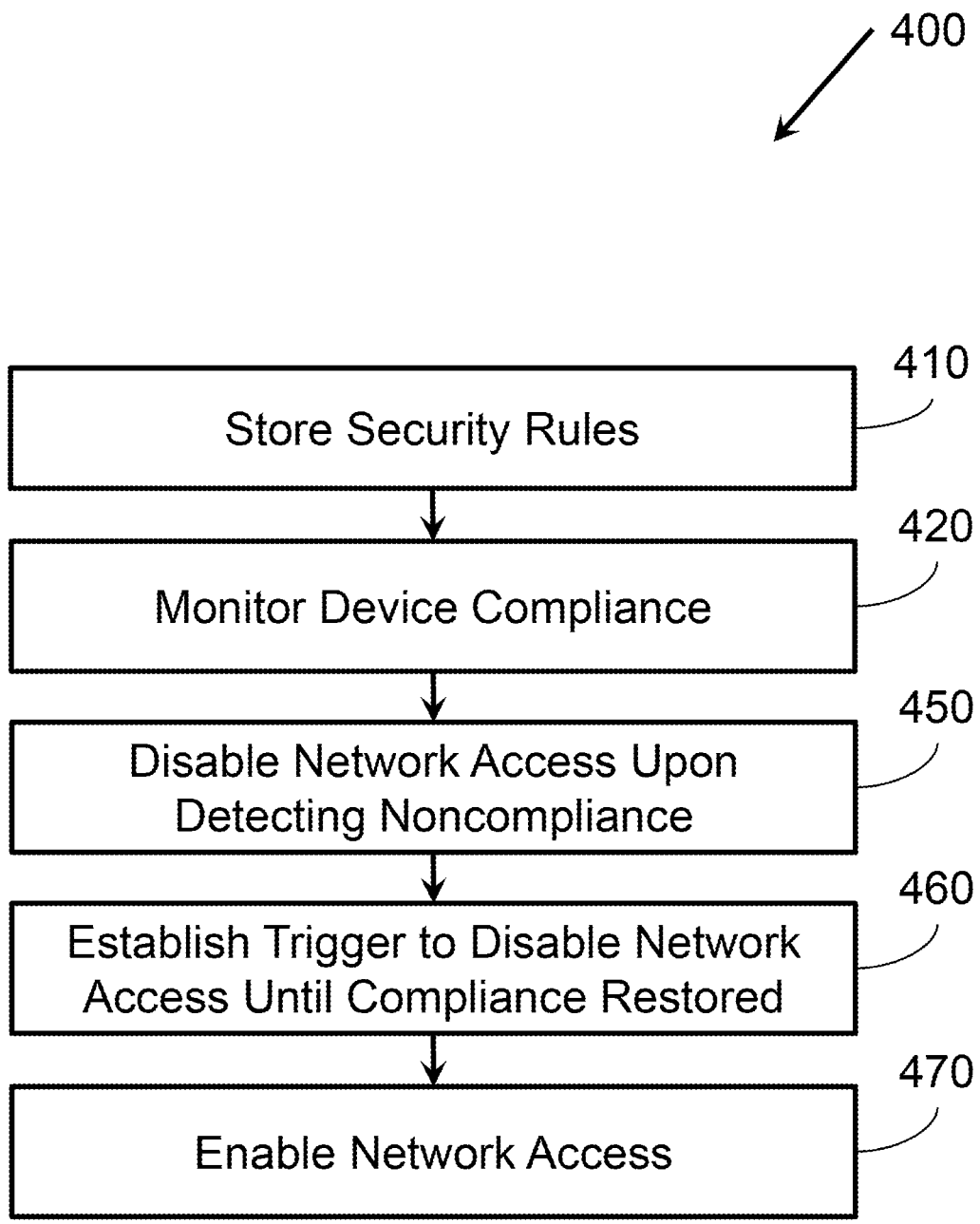
FIG. 4 illustrates another flowchart of example operations associated with network device compliance.
Figure 5:
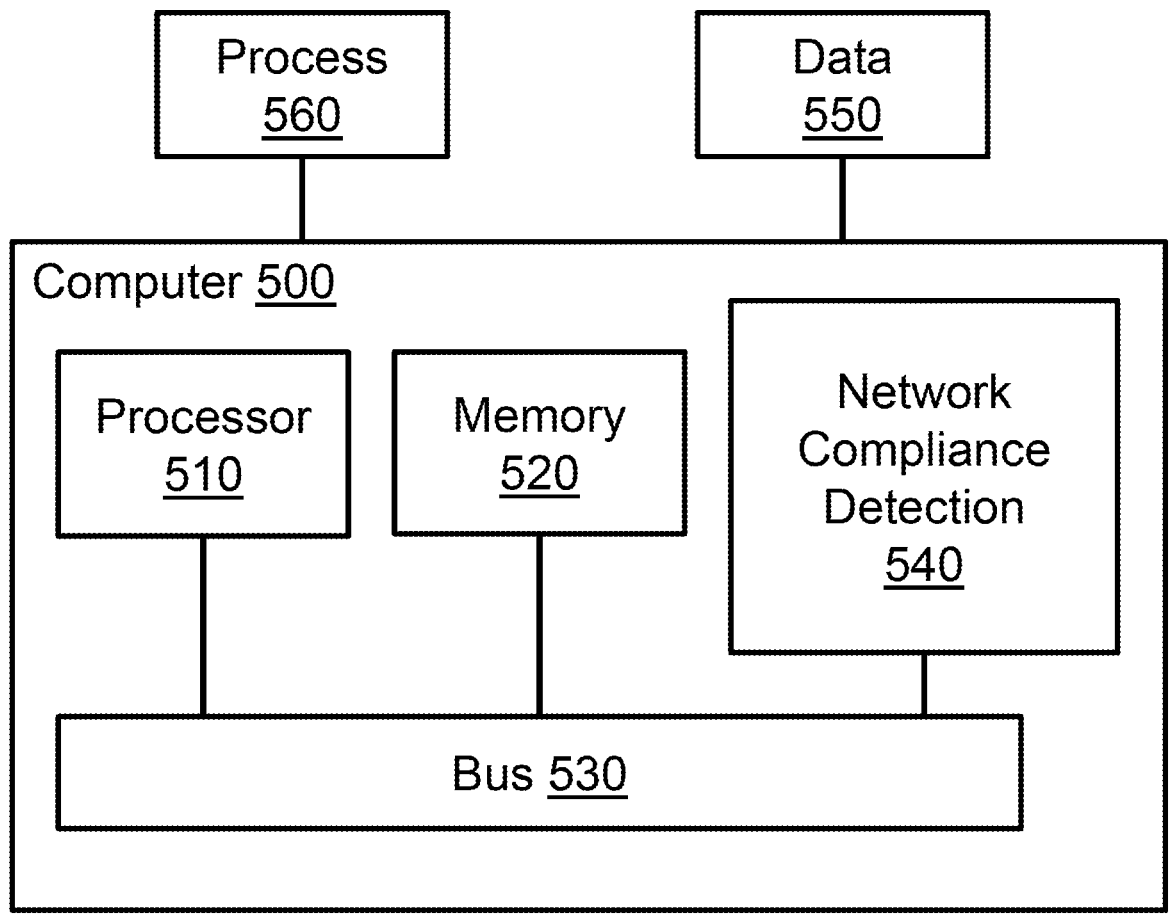
FIG. 5 illustrates an example computing device in which example systems, and methods, and equivalents, may operate.

FIG. 4 illustrates a method 400. Method 400 may be performed by, for example, a processor. Method 400 includes storing a set of security rules at 410. The security rules may be associated with a device associated with the processor. For example, the processor may control various components of the device and the device may house the processor.

Method 400 also includes monitoring device compliance for the set of security rules at 420. Method 400 also includes disabling network access for the device at 450. Network access may be disabled upon detecting noncompliance of an identified security rule.

Method 400 also includes establishing a trigger at 460. The trigger may disable network access for the device when network access for the device is restored prior to the device returning to compliance with the identified security rule. This may occur when network access is restored by, for example, enabling a previously disabled networking component in the device, installing a new networking component in the device, and so forth.

In some examples, method 400 may also include attempting to return the device to compliance with the identified security rule (not shown). A predetermined number of attempts may be made based on a set of techniques specified in association with the security rule.

Method 400 also includes enabling network access for the device at 470. Network access may be enabled upon detecting the device has returned to compliance with the identified security rule.

FIG. 6 illustrates an example computing device in which example systems and methods, and equivalents, may operate. The example computing device may be a computer 600 that includes a processor 610 and a memory 620 connected by a bus 630. Computer 600 includes a network device compliance 640. Network device compliance 640 may perform, alone or in combination, various functions described above with reference to the example systems, methods, and so forth. In different examples, Network device compliance 640 may be implemented as a non-transitory computer-readable medium storing processor-executable instructions, in hardware, as an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory, flash memory, memristor) and/or volatile memory (e.g., random access memory). Memory 620 may also be, for example, a magnetic disk drive, a solid-state disk drive, a floppy disk drive, a tape drive, a flash memory card, an optical disk, and so on. Thus, memory 620 may store process 660 and/or data 560. Computer 600 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A method for managing network device compliance, comprising:
   storing, by a device, a set of security rules for the device;
   monitoring, by the device, compliance for the set of security rules; and
   upon detecting, by the device, noncompliance of an identified security rule:
   disabling, by the device, network access for the device by disabling a hardware component of the device; and
   establishing, by the device, a trigger to re-disable network access for the device when network access for the device is restored by enabling a previously disabled hardware component of the device prior to returning the device to compliance with the identified security rule, wherein the trigger causes the device to re-disable the hardware component of the device to re-disable the network access in response to the hardware component of the device being enabled prior to the device being in compliance with the identified security rule.

2. The method of claim 1, where the security rules specifies applications to be running on the device during operation of the device.

3. The method of claim 1, where disabling network access for the device includes disabling a hardware component of the device associated with network access.

4. The method of claim 3, where the hardware component is one of a network card, a communications port, and a wireless network adaptor.

5. The method of claim 1, where the set of security rules are received from one of a user of the device, and a remote information technology resource responsible for maintaining security of one of the device and a network the device connects to.

6. The method of claim 1, comprising restoring network access to the device upon detecting return of the device to compliance with the identified security rule.

7. The method of claim 1, where disabling network access includes preventing applications of the device from detecting a hardware component of the device.

8. The method of claim 1, comprising attempting to return the device to compliance with the identified security rule prior to disabling network access for the device.

9. A device for managing network device compliance, comprising:
   a data store to store a set of security rules for the device;
   a network device for connecting the device to a network;
   a monitor module to control the device to enter a non-compliant state upon detecting that the device is in noncompliance with an identified security rule of the set of security rules; and
   a network access control module of the device to attempt to return the device to a compliant state by returning the device to compliance with the identified security rule, to disable the network device by disabling a hardware component of the device, and to establish a trigger to re-disable a previously disabled hardware component of the network device when network access for the previously disabled network device is restored and reenabled prior to the device returning to a compliant state.

10. The device of claim 9, where the trigger to disable the network device is a trigger that detects when the network device is reenabled and notifies the network access control module to allow the network access control module to disable the network device.

11. The device of claim 9, where the network access control module also establishes a trigger to disable an installed network device upon detection of installation of the installed network device.

12. The device of claim 9, where the trigger is based on one of a Windows WMI event and a platform invocation call.

13. A non-transitory computer-readable medium storing processor executable instructions for managing network device compliance that, when executed by a processor, control the processor to:

store, on a device, a set of security rules associated with the device associated with the processor; monitor device compliance for the set of security rules;

disable network access for the device upon detecting noncompliance of an identified security rule by disabling a hardware component of the device;

establish a trigger to re-disable network access for the device by re-disabling a previously disabled hardware component of the device when network access for the previously disabled device is restored and reenabled prior to the device returning to compliance with the identified security rule; and enable network access for the device upon detecting the device has returned to compliance with the identified security rule by enabling the hardware component of the device.

14. The non-transitory computer-readable medium of claim 13, where network access is restored by one of enabling a previously disabled networking component in the device, and installing a new networking component in the device.

15. The non-transitory computer-readable medium of claim 13, where the instructions further control the processor to attempt to return the device to compliance with the identified security rule a predetermined number of times using a set of techniques specified in association with the security rule.

* * * * *